United States Patent [19]
Gütlhuber et al.

[11] 3,961,013
[45] June 1, 1976

[54] PROCESS AND APPARATUS FOR MANUFACTURING FITTINGS, PREFERABLY PRESSURE PIPE INSERTION FITTINGS OF SYNTHETIC RESIN

[75] Inventors: Johann Gütlhuber, Irlbach; Karl Mühlner; Peter Klenk, both of Munich, all of Germany

[73] Assignee: Kunststoffwerk Gerbruder Anger GmbH & Co., Munich, Germany

[22] Filed: Aug. 21, 1973

[21] Appl. No.: 390,206

[52] U.S. Cl. .............................. 264/297; 264/328; 264/334; 425/249
[51] Int. Cl.² .................................. B29C 25/00
[58] Field of Search ............. 264/318, 328, 22, 237, 264/297, 334; 249/152, 178; 425/150, 249, 468

[56] References Cited
UNITED STATES PATENTS

| | | | |
|---|---|---|---|
| 3,429,007 | 2/1969 | Aoki | 425/249 |
| 3,557,290 | 1/1971 | Siegfried et al. | 264/294 |
| 3,576,929 | 4/1971 | Turner et al. | 264/237 |
| 3,607,569 | 9/1971 | Greenwell | 264/22 |
| 3,711,590 | 1/1973 | Deutsch | 264/328 |
| 3,728,065 | 4/1973 | Figwer | 249/178 |
| 3,737,512 | 6/1973 | Stalter | 264/318 |
| 3,758,253 | 9/1973 | Pearne | 264/237 |

Primary Examiner—Robert F. White
Assistant Examiner—T. E. Balhoff
Attorney, Agent, or Firm—Edmund M. Jaskiewicz

[57] ABSTRACT

A core unit is moved into position within the mold halves of an injection mold and a casting is molded therein. The outer wall zones of the casting are cooled sufficiently to enable the casting to maintain its shape. At the beginning of the shrinking of the casting and while the inner wall zones of the casting are still in the plastic state but before any stresses are set up in the casting the divided mold is opened. The core and the casting thereon are removed from the mold to a cooling station where the casting is rapidly cooled and the core is then removed from the cooled casting. A corrugation can be formed in a tubular casting by positioning a ferromagnetic insert member upon the core and establishing a magnetic field to maintain the insert member in position during the casting process. The core can be provided with permanent magnets or electromagnets to hold the insert member in position.

6 Claims, 9 Drawing Figures

PROCESS AND APPARATUS FOR MANUFACTURING FITTINGS, PREFERABLY PRESSURE PIPE INSERTION FITTINGS OF SYNTHETIC RESIN

The present invention relates to the injection molding of thick-walled pressure pipe fittings or other tubular elements, more particularly, to the cooling of such castings so as to prevent internal stresses from being set up therein.

A wide variety of tubular elements including pipe fittings have been formed by injection molding from a synthetic plastic material. Such fittings which may comprise elbows, Tees, connections both 45° and 90° and other angles have been molded from a wide variety of synthetic resins and other materials in various diameters and sizes as required for pipes intended to handle fluids at or near atmospheric pressures. Such fittings have also been formed by blow molding such as disclosed in U.S. Pat. No. 3,291,670. However, it is very difficult to obtain fittings of precise dimensions by such a process and also the resulting fittings are relatively expensive to manufacture.

A different method was proposed as disclosed in the German Utility Model Patents 1 841 681 and 7 031 799. However, the fittings obtained from these processes are suitable for use only in pipes in which the fluids are not under pressure and the fittings can not be employed in pipes under pressure. The manufacture of a simple T-connection for pressure pipes introduces particular problems with respect to shrinking of the casting and stresses formed during the molding operation. The manufacture of such fittings is expensive and difficult even for pressureless pipes. The problems are significantly increased when the fittings are intended for use in pressure pipes such as in various utility lines including water pipes that are subjected continuously to a pressure of ten atmospheres or greater.

It has also been proposed to have pressure pipe fittings of PVC that are bonded to the pipe to be connected. However, such bonded connections have not been particularly satisfactory in practice.

British Patent 825,520 and German DAS 1 238 654 both disclosed an injection molding process for fittings which recognize the problem of providing such fittings which are free of stresses. However, these processes enable one to make fittings of relatively small dimensions and small wall thicknesses and, at the same time, the processes were both difficult and not economically feasible. For pressure pipe fittings of relatively large dimensions such as 200mm. and greater the wall thickness must be proportinately increased. However, as the wall thickness is increased the problems of injection molding such fittings are also increased. The fitting must be absolutely free of any internal stresses in order to be reliable in operation. In addition, difficulties are encountered with the proper shrinking of the molded material during the cooling of the casting. Difficulties have also been met in forming annular corrugations in the tubular portions of thickwalled fittings. It is known from previous experience that one must avoid various shaping and forming operations after the injection molding of the castings. In order to carry out a subsequent shaping operation to make a corrugation the material must again be heated to its thermoelastic range. It was also proposed to work the cast hollow elements by machining processes but such processes were difficult and expensive and required highly skilled personnel. In addition, it was not possible to automate such operations except at very high cost. However, it is recognized in the industry that it is necessary to produce corrugations and sockets on such pipe fittings molded of synthetic resin.

In an attempt to form such corrugations various forms of collapsiable cores have been proposed for positioning in the injection mold. Such cores were disadvantageous in that they required complicated mechanism and also during the injection of the molding material under high pressure into the mold the material flowed into the gaps and spaces between the segments or components of the collapsiable core. The gaps gradually increased and thus necessitated high maintenance efforts and costs.

It has further been proposed to position a destructable ring about the core at the position where the corrugation is to be formed. Since such a ring is to be used for only a single casting the process rapidly became very expensive in view of the large quantity of disposable rings required.

A main problem in the injection molding of thick-walled pipe fittings is that considerable time is required to cool the fitting. The resin injected in the plastic state into the mold must be cooled sufficiently so that the casting retains its shape. The mold halves can be opened and the casting removed only after this state has been retained. The long cooling time results from the fact that the casting can not be cooled directly. The cooling occurs only while the casting is still in the mold. Since the mold is still at least partially heated the length of the cooling and the duration of time for which the casting must remain in the mold is quite long.

On the other hand, it is not desirable to intensively cool the injection mold since the mold must have a certain temperature when the molding material is injected therein. If the mold were cooled a lengthy heating period would then be required to bring the temperature of the mold up to its desired level. The long cooling periods have the further disadvantage that the material in the injection cylinder is subjected to high temperatures for relatively high periods of time which may lead to deterioration or even combustion of the material. Further, the casting is not able to shrink in its longitudinal direction while it is cooling in the mold. Thus, the casting is subjected to high residual stresses which may lead to premature breaking of the casting during the application of loads in the testing laboratories such as would occur for fittings for water pipes and the like.

In an attempt to shorten the cooling periods and thus reduce the time between individual molding operations various forms of multi-station injection molding machines have been proposed. However, such machines are rather expensive since they require a complete injection molding apparatus for every unit for opening and closing the mold.

It is therefore the principal object of the present invention to provide a novel and improved process and apparatus for the injection molding of thick-walled pipe fittings which are free of internal stresses.

It is another object of the present invention to provide such a process and apparatus whereby the pipe fittings can be rapidly and economicaly molded by regulation of the temperatures of the casting during the cooling process.

It is a further object of the present invention to provide a process and apparatus for the simple and economical forming of corrugations and the like in tubular elements during injection molding.

According to one aspect of the present invention a process for molding stress-free thick-walled pressure pipe fittings from a synthetic plastic material may comprises moveably positioning a core unit in a divided injection mold and injecting the synthetic plastic molding material into the mold around the core to form the casting. The outer wall zones of the casting are cooled sufficiently to enable the casting to enable its shape. At the beginning of the shrinking of the casting which sets in because of the material dependent coefficient of the expansion and while the inner wall zones of the casting are still in the plastic state but before any stresses are set up in the casting the divided mold is opened. The casting is maintained upon the core unit and both the casting and the core unit are removed from the mold to a station at which the casting is rapidly cooled. The core unit is then removed from the cooled casting. In order to form an annular corrugation and the like in the tubular element during the injection molding process an insert member of ferromagnetic material is slid upon the core to the position at which the corrugation is to be formed and a magnetic field is established to act upon the insert member to retain the insert member in position.

The apparatus for molding the pipe fittings may comprise a injection molding station including means for opening and closing the mold halves. A frame extends from both sides of the injection molding station and a cooling station is provided at each end of the frame. An auxiliary frame is movably mounted on the frame and first and second core units are mounted on the auxiliary frame for limited movement perpendicular to the plane of opening of the mold halves. The core units are so spaced that when one core unit is at the molding station the other core unit will be at the cooling station. The apparatus for forming the corrugation may comprise an annular insert member of thermomagnetic material which is slidably positioned upon the core about which a casting is to be molded. A magnet, a plurality of magnets or a plurality of electromagnets are mounted on the core at the position corresponding to that of the corrugation to be formed. A magnetic field is then established to maintain the insert member in position during the molding operation.

Other objects and advantages of the present invention will be apparent upon reference to the accompanying description when taken in conjunction with the following drawings which are exemplary, wherein.

Proceeding next to the drawings wherein like reference symbols represent the same parts throughout the various views a specific embodiment of the present invention will be described in detail.

Figure 1:
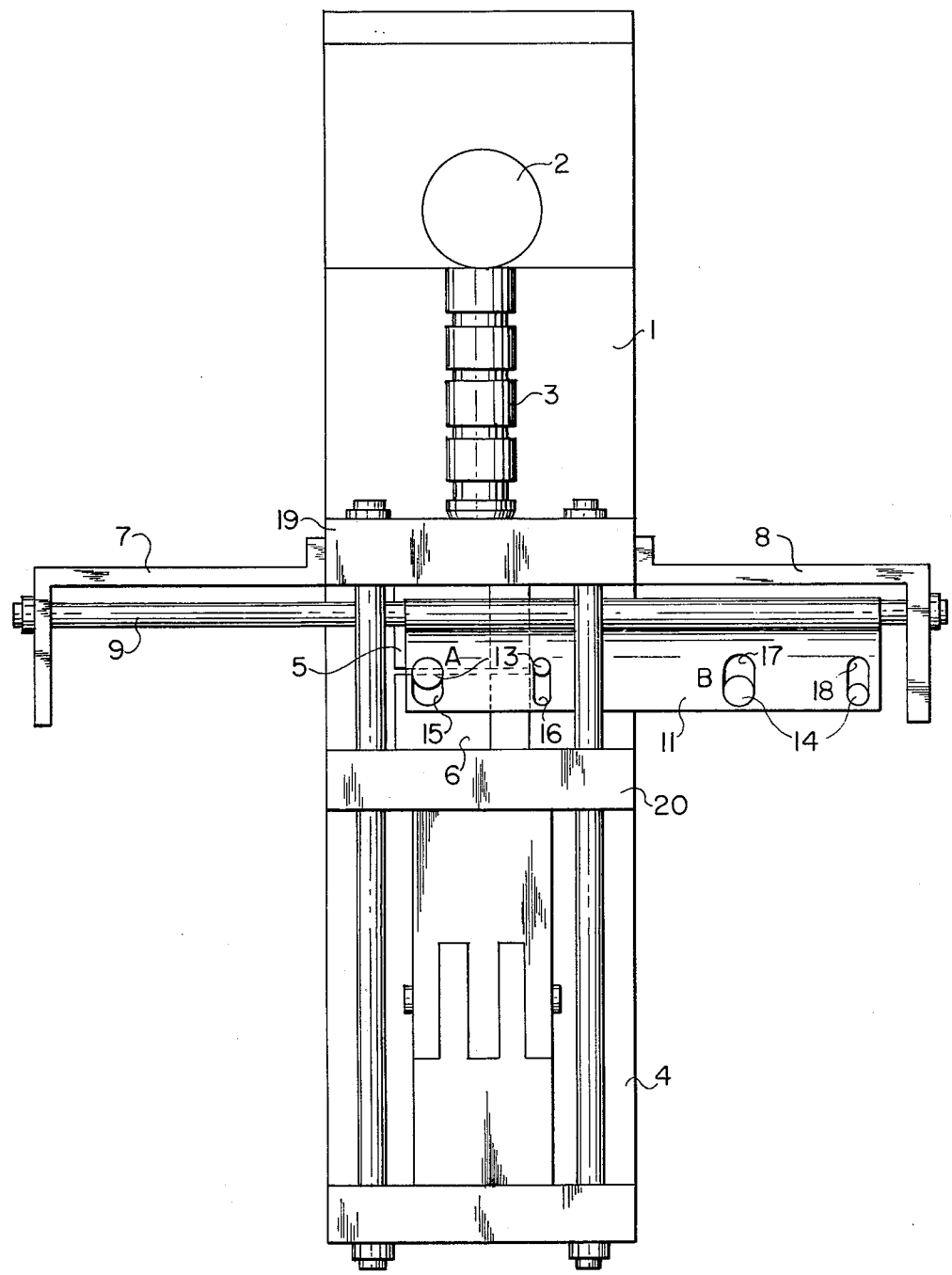
FIG. 1 is a side elevational view of the injection molding apparatus according to the present invention.
Figure 2:
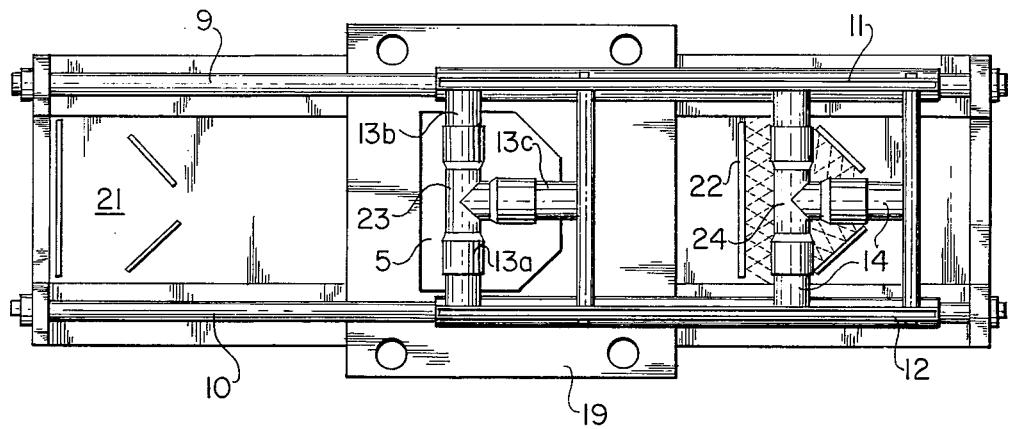
FIG. 2 is a top plan view of the apparatus of FIG. 1.

As may be seen in FIGS. 1–6 an injection molding machine as well known in the art is shown at 1 and comprises a feed chamber 2 through which a molding material is supplied and a cylinder 3 through which the molding material is injected into a mold supported upon a closing unit 4. The mold halves of the injection mold are shown at 5 and 6 and are illustrated in FIG. 1 at the molding station in their closed position. A frame 7 and 8 extends laterally from both sides of the injection molding machine 1 and is provided with a pair of cross pieces or guides 9 and 10 upon which are movably mounted supports 11 and 12 which constitute an auxiliary frame. Core units 13 and 14 are mounted on the auxiliary frame upon bars which are received in slots 15 and 16 for core unit 13 and in slots 17 and 19 for core unit 14. The mold halves are clamped together in position by plates 19 and 20. Cooling stations 21 and 22 are provided at both ends of the frame as shown in FIG. 2 and comprise a plurality of spray units for spraying a finely dispersed coolant in the form of a gas or liquid onto the castings when moved to the cooling stations.

In carrying out the process according to the present invention the injection molding machine 1 is in the position as shown in FIG. 1 and synthetic resin molding material is injected from the cylinder 3 into the closed mold halves 5,6 around core unit 13 and a casting 23 is formed. At the same time, a casting 24 which was produced previously is at the cooling station 22 as shown in FIG. 2 and is being cooled rapidly by spraying. The casting 24 is still on the core unit 14. A short time after the plastic molding material has been injected into the mold halves, 5,6 the mold halves are separated along their plane of opening by the closing unit 4 while the casting 23 remains upon the core unit 13. The opening of the mold halves occurs when the outer wall zones of the casting have cooled sufficiently to enable the casting to maintain its shape. Also, this opening of the molds occurs at the beginning of the shrinking of the casting which sets in because of the material dependent coefficient of expansion and while the inner wall zones of the casting are still in the plastic state but before any stresses are set up in the casting because of cooling.

Figure 3:
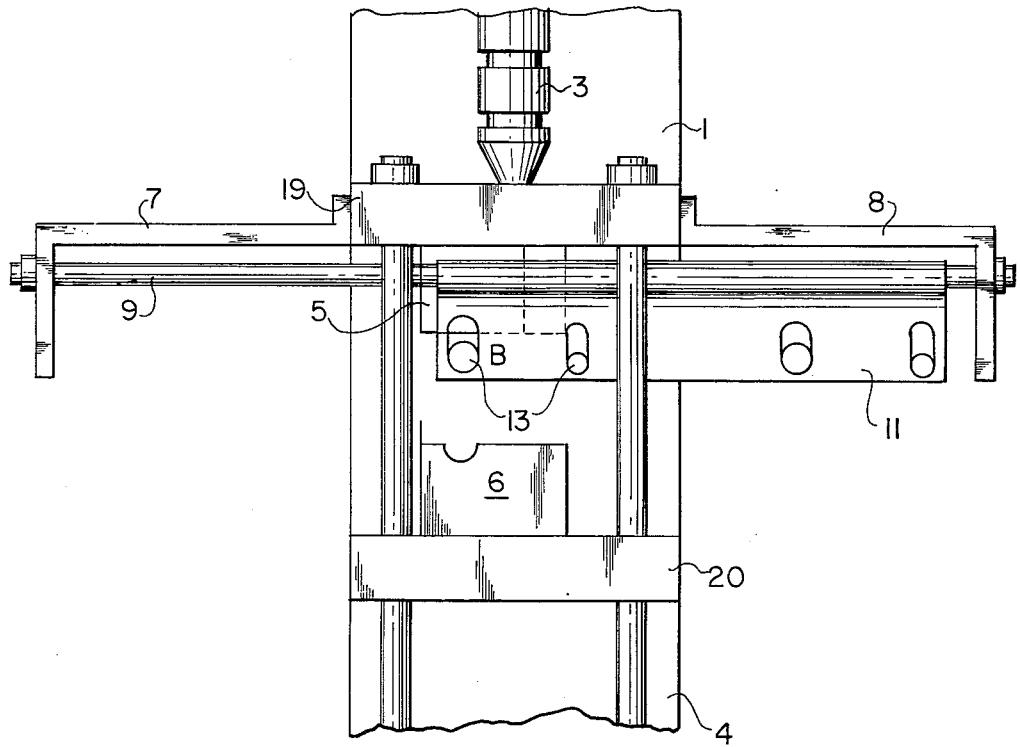
FIG. 3 is a side elevational view of a portion of the apparatus of FIG. 1 and showing the mold halves in the open position.
Figure 4:
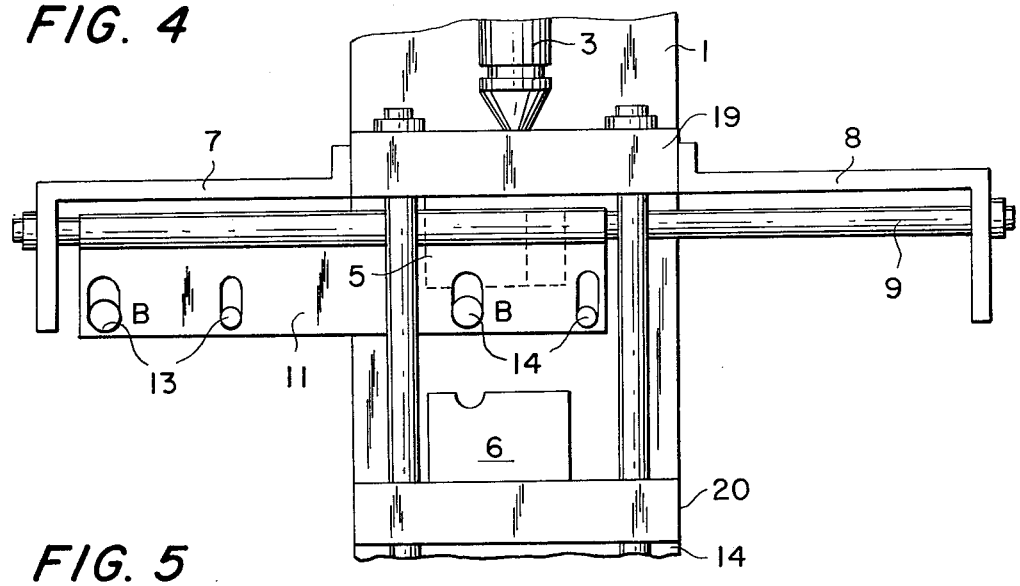
FIG. 4 is a view similar to that of FIG. 3 but showing the auxiliary frame in a different position to bring a second core unit into the molding station.
Figure 5:
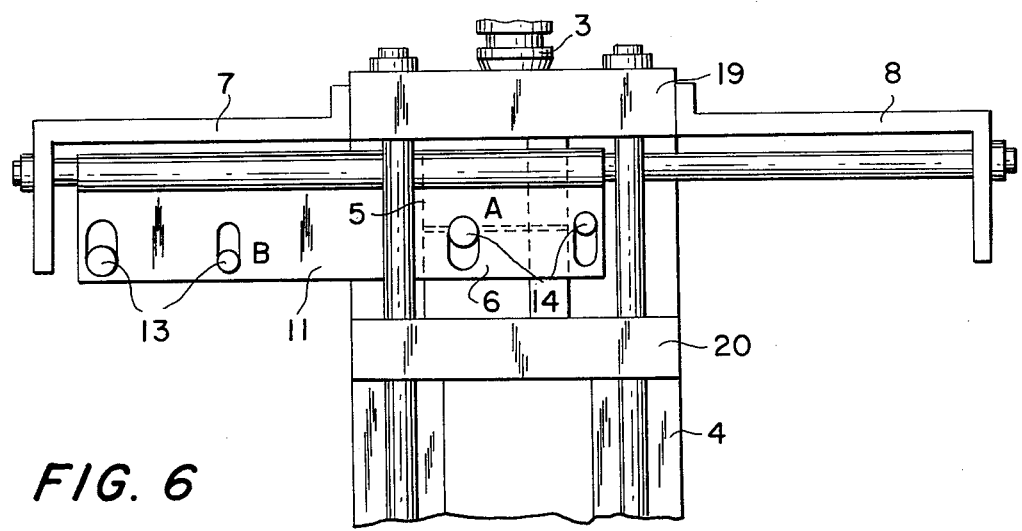
FIG. 5 is a view similar to that of FIG. 4 but showing the mold in the closed position.

The core unit 13 with the casting 23 thereon is then moved from position A as shown in FIG. 1 into a position B as shown in FIG. 3 under the guidance of the slots 15 and 16. Subsequently the auxiliary frame 11, 12 carrying the core units 13 and 14 is moved into the position shown in FIG. 4. In this position, the sprays at cooling station 21 become operative and intensively and rapidly cool the casting 23.

Figure 6:
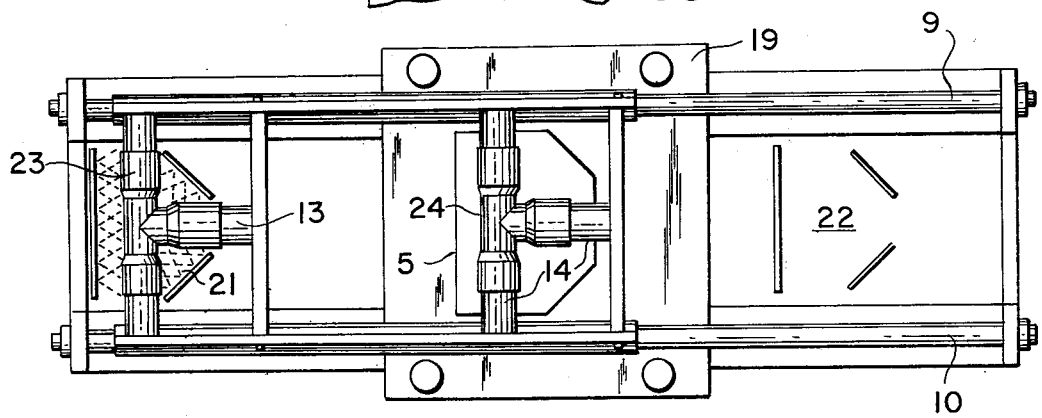
FIG. 6 is a top plan view of the apparatus in the position as shown in FIG. 5.

At the same time that the core unit 13 is moved out of the injection molding station to cooling station 21, core unit 14 is moved into the injection molding station. As the core unit 14 arrives at the injection molding station it is in position B and is subsequently moved into position A as the mold halves are closed. The molding cycle is now ready to start again and the molding material is injected into the mold from the cylinder 3 as previously described. A new casting is thus produced as shown in FIG. 6 and the sequence as described above proceeds again.

Figure 7:
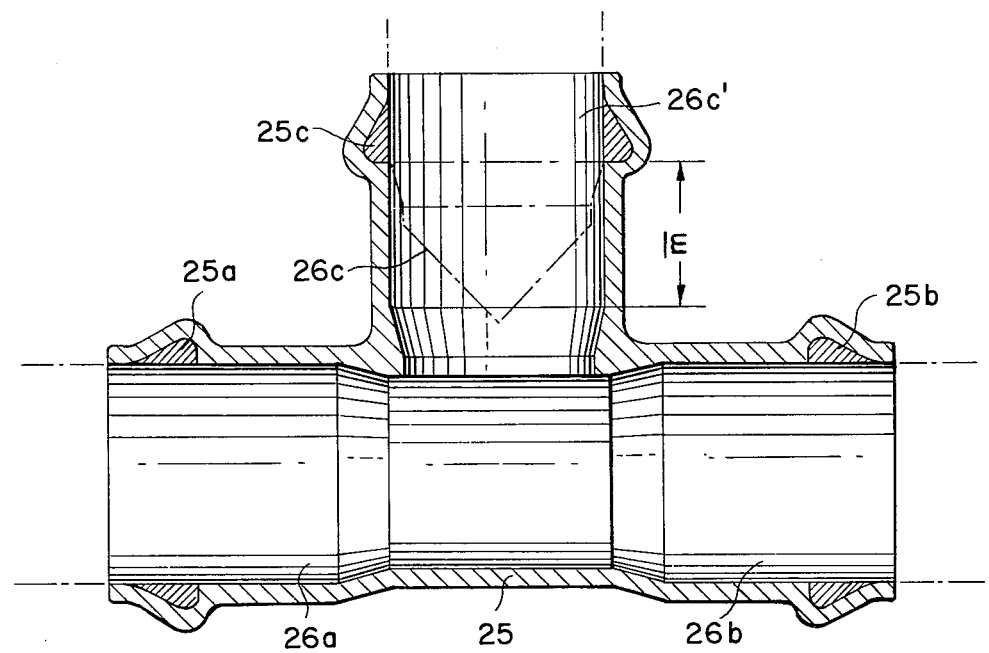
FIG. 7 is a longitudinal sectional view of the casting formed with the apparatus of FIGS. 1–6 and showing the cores in position.

During the cooling operation, the castings 23 or 24 on core units 13 or 14 respectively may shrink unrestricted in the longitudinal direction which is along the portion 25 as shown in FIG. 7. As soon as the casting has cooled sufficiently so as to maintain its shape the shrinking in the longitudinal direction is further improved by withdrawing cores 13c or 14c partially or completely while the cores 13a and 13b or 14a and 14b are withdrawn from the casting only at a later time.

With particular reference to the casting 25 as shown on the cores in FIG. 7, core 26c located in the branch or lateral connection of casting 25 is withdrawn initially shortly after the casting is removed from the mold halves to a maximum distance indicated by $\overline{m}$ which is the distance of the tubular portion to corrugation 25c. As a result, core 26c which is thus partially withdrawn supports the front portion of the tubular section comprising corrugation 25c while the section $\overline{m}$ can shrink freely. The diameter of core section 26c corresponds to the diameter of the casting in the upper portion or outwardly of the corrugation 25c. Cores 26a and 26b can be withdrawn at the same time as core 26c or after a certain time interval has elapsed time $t$ wherein this time interval is selected to promote further the shrinking process The critical portions of the casting 25 which are the tubular sections with their corrugations 25e and 25d are thus completely supported during the cooling operation so that their resulting dimensions are precise and accurate in accordance with the magnitudes as initially determined.

The process and apparatus as disclosed herein can be completely automated and programed for any kind of synthetic resin material. It is to be understood that the process is not restricted to the particular type of casting illustrated in FIG. 7 but can be employed to other types of fittings including connections wherein the lateral branches are at any angle to the main line portion.

It is apparent that the problem of shrinking is peculiar to pressure pipe fittings having a branch or lateral connection such as in a Tee is eliminated by initially withdrawing the core which is in the branch to enable the casting to shrink freely in an axial direction with respect to the branch. Thus, no additional stresses are set up in the casting during cooling. The result is a uniform shrinking process together with a uniform distribution of any residual stresses that may still be present. The relatively early withdrawal of the core from the branch is obtained as a result of increasing the dimension of the branch core to the extent that the diameter of the branch is reduced through shrinkage.

The shrinking in the axial directions of the casting on each side of the branch is adapted to the radial shrinking of the branch. This also can be obtained through a suitable dimensioning of the cores and of the mold. As known in the art, a proportioning and dimensioning of the cores and the mold are dependent on the properties of the molding material.

Figure 8:
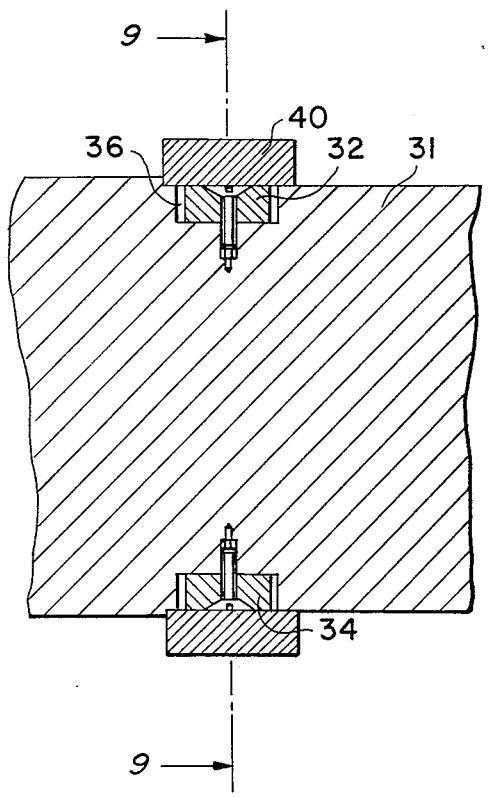
FIG. 8 is a longitudinal sectional view of a portion of the core showing the magnets and insert member for the forming of a corrugation.

In order to form the corrugations 25a, 25b, 25c that are in effect, back tapers or under cuts the core 31 as shown in FIG. 8 is provided with a recess or a plurality of recesses in its peripheral surface in which opposition an electromagnet or permanent magnet or a plurality of electromagnets or permanent magnets 32–35. Electrically insulating sleeves 36–39 are positioned around each of the magnets or electromagnets so as to be between the magnetic member or the core. An annular insertion member 40 is slid onto the core 31 into the position at which it is desired to form the corrugation. This position corresponds with the position of the magnets as shown in FIG. 8. The insertion member may comprise either a singular annular member or a number of separate components or segments interlocked together which may be readily disassembled to facilitate removal from the corrugatian.

Figure 9:
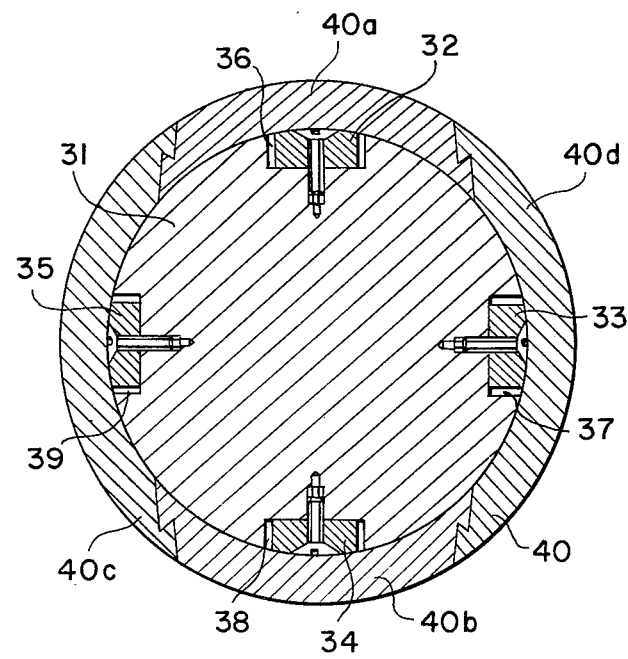
FIG. 9 is a sectional view taken along the line 9—9 of FIG. 8.

After the molding material has been introduced around the core and the insertion members to form the casting the insertion member is retained in position by a magnetic field. After the casting has been cooled and the magnetic field has been removed the casting is removed from the mold in the manner as described above and the insertion member then removed from the formed corrugation. Where the insertion member comprises a plurality of segments as shown in FIG. 9 the segments 40a and 40b are first drawn radially inwardly and subsequently the segments 40c and 40d are then removed.

The use of the insertion member as disclosed herein may also be applied to the forming of sockets on a wide variety of forms of tubular members. The process may also be employed for producing other components having corrugations formed in the original molding process.

Thus it can be seen that the injection molding process of the present invention has the advantage that the temperatures in the injection mold are considerably lower than in the injection molds used in previous injection molding processes. According to the present invention, the cores are subjected to a continuous cooling but the mold can be regulated in temperature, by heating or cooling, as may be required.

In addition, automation of the molding process and apparatus is significantly facilitated by the provision of the core displacement unit that permits a lateral withdrawal of the casting together with its core unit. While the casting on its core unit is cooled intensively directly by a cooling medium a new casting is produced by moving a second core unit into the injection mold which has not been allowed to cool. The new core unit is moved into the molding station at the same time as the first core unit is moved laterally from the molding station to its cooling station. The cooling period can be reduced to a minimum by the use of particular nozzles or jet sprays that permit an intensive cooling.

It will be understood that this invention is susceptible to modification in order to adapt it to different usages and conditions, and accordingly, it is desired to comprehend such modifications within this invention as may fall within the scope of the appended claims.

The embodiments of the invention in which an exclusive property or privilege is claimed are defined as follows:

1. In a process for molding stress-free thick-walled pressure pipe fittings of relatively large dimensions and where the wall thickness must be proportionally increased from a synthetic plastic material, the steps of movably positioning a core unit in a divided injection mold for a fitting having a branch portion extending from a main portion and cores are placed in both portions, injecting a synthetic plastic molding material into the mold around the core to form a casting, cooling the wall outer zones of the casting sufficiently to enable the casting to maintain its shape, opening the divided mold at the beginning of the shrinking of the casting which sets in because of the material dependent co-efficient of expansion and while the wall inner zones of the casting are still in the plastic state but before any stresses are set up in the casting, maintaining the casting upon the core unit and removing the casting and core unit from the mold, withdrawing the core from said branch portion a distance sufficient to permit unrestricted shrinkage in a longitudinal direction with respect to the branch portion, thereafter rapidly cooling the casting, and then withdrawing all the cores after the shrinking of the castings in both axial and radial directions has been completed.

2. In a process as claimed in claim 1 wherein all of the cores are partially withdrawn simultaneously to the predetermined distances, after shrinking has been completed all of the cores are completely withdrawn simultaneously.

3. In a process as claimed in claim 1 wherein the temperature of the core is lower than that of the mold.

4. In a process as claimed in claim 1 wherein the temperatures of the mold and core are lower than the flow temperature of the molding material.

5. In a process as claimed in claim 1 and moving a second core unit into the mold when the first core unit and the casting thereon is removed therefrom to form a further casting while the first casting is cooling.

6. In a process as claimed in claim 1 and moving the core unit in a direction perpendicular to the plane of opening of the divided mold subsequently to opening the mold and then moving the core unit in a direction substantially parallel to the plane of opening.

* * * * *